(12) United States Patent
Sheperd (10) Patent No.: US 8,249,995 B2
(45) Date of Patent: Aug. 21, 2012

(54) METHOD USING MARKET-BASED SOCIAL NETWORKING TO CREATE JOBS AND REFERRAL FEES

(75) Inventor: Robert Anthony Sheperd, San Diego, CA (US)

(73) Assignee: Robert A. Shepard, San Diego, CA (US)

( * ) Notice: Subject to any disclaimer, the term of this patent is extended or adjusted under 35 U.S.C. 154(b) by 612 days.

(21) Appl. No.: 12/427,734

(22) Filed: Apr. 21, 2009

(65) Prior Publication Data

US 2010/0057535 A1 Mar. 4, 2010

Related U.S. Application Data

(60) Provisional application No. 61/047,316, filed on Sep. 2, 2008.

(51) Int. Cl.
*G06Q 10/00* (2012.01)
(52) U.S. Cl. ...................................................... 705/321
(58) Field of Classification Search .................. None
See application file for complete search history.

(56) References Cited

U.S. PATENT DOCUMENTS

| | | | |
|---|---|---|---|
| 2008/0222127 A1* | 9/2008 | Bergin | 707/5 |
| 2009/0094239 A1* | 4/2009 | Sabol et al. | 707/6 |
| 2009/0327013 A1* | 12/2009 | McGovern et al. | 705/8 |
| 2011/0113113 A1* | 5/2011 | Ryan et al. | 709/206 |

* cited by examiner

*Primary Examiner* — Jonathan Ouellette
(74) *Attorney, Agent, or Firm* — Daryl D. Muenchau (57) ABSTRACT

This method uses a jobs-based social networking website and the monetary incentive of a "job reward" to get friends, relatives and other visitors to the website to offer a personal introduction to a company insider in exchange for the exclusive contractual right to receive a contingent referral fee if the introduced person starts a job with the named company within the time period set forth in the contract. Ideally, hundreds if not thousands of people will review a person's profile on the social networking website. If the job candidate is qualified, many offers of introduction will be made. The jobseeker can accept many offers but only one offer of introduction per company or non-profit entity in a given time period. Since the job candidate will only start one job within that relatively short period of time, only one referral fee will need to be paid.

15 Claims, 6 Drawing Sheets

METHOD USING MARKET-BASED SOCIAL NETWORKING TO CREATE JOBS AND REFERRAL FEES

This patent application claims priority to the U.S. provisional patent Application No. 61/047,316, filed 23 Apr. 2008.

BACKGROUND OF THIS INVENTION

1. Field of the Invention

This invention is applicable to the employment field. The process works by applying two real estate concepts to the job market, adding a bid-based profit incentive to internet-based social networking, and segmenting the job market by region and profession. Several other concepts optimize the results of this method, including targeted ads for education and professional organizations, site search, database management of job seekers, job finders and their company contacts, and the job-seeker-job finder contracts, payment methods, a fraud provision in the "terms of use" of the website, a exclusive use clause for sharing the database with prospective employers, and the use of mentoring, digital portfolios, and video resumes.

The two real estate concepts are the "contingent referral fee" and the "single party show" agreements. With the "contingent referral fee", real estate agents contract to pay another real estate agent a referral fee if a sales lead results in a listing agreement. A real estate agent can contract with a home owner to do a "single party show" whereby the agent will get paid a sales commission if they sell the home to a single individual named in the contract. Both agreements are contingent as they contain promises for the second party to pay the first party if a third party enters into a contract with the second party.

The Problem Solved

The purpose of this invention is to solve the problem of unemployment. This process turns the problems of unemployment and underemployment into a profit opportunity available to anyone. This idea also applies to contractors seeking a contract, vendors and commissioned salespeople looking for sales leads, and businesses and non-profits trying to raise funds. It helps individuals make contacts, develop their talents, interview at top companies, and get their dream jobs. More importantly, this process encourages discussions about redirecting talent to areas of growth and applying talent to solve society's problems and add value to the economy.

This process creates a framework for "collective intelligence" in two ways. First, this process provides economic incentives for people to use their personal contacts and their talents (social skills, business acumen, and technical capabilities) to help other people advance their careers or businesses. Secondly, it creates discussions between company insiders and outside professionals. These discussions create new ideas, new areas of research and investment, and new jobs.

This invention should make it easy for people to find jobs because hundreds, perhaps thousands, of people will be looking at the individual's profile/desired job to see if they can offer them an introduction that might lead to a job which would result in a referral fee for the person making the introduction. Secondly, we can expect people within companies to search the internal job board to see if there is a job that some outsider might qualify for, interview for and accept, and then they would search the website to make a match and offer an introduction. Thirdly, we can expect companies to offer to pay the "job reward" to place an existing employee with another firm, as an outplacement alternative. The bottom line is that this website will drive employee turnover and higher pay. In addition, it will create a new source of income, as referral fees will likely be five to ten percent of annual pay. Retirees will love helping young people advance their careers while getting paid for making that connection that resulted in a job.

This job-matchmaking should be very popular because people have the opportunity to make thousands of dollars with very little investment of time and money and with little downside risk. Individuals have the opportunity to help someone get a new job simply by introducing someone to someone else and then get compensated with thousands of dollars if that person starts a new job at that company. The companies are still responsible for interviewing the potential employee, performing background checks and conducting drug tests, and they can fire the person if things don't work out.

Currently, over 60% of new jobs are obtained through networking, and the time between jobs is about four months. This website, which uses jobs-oriented social networking with economic incentives, will speed up and expand the amount of jobs-oriented networking. Every job seeker will have hundreds of job finders reviewing their job ambitions and will receive many offers for personal introductions if they have realistic job expectations and most of the qualifications for their next career move.

This website will be popular with ambitious employees as it allows them an anonymous way of conducting a job search and an effortless way of expanding their business contacts. This should also be popular with retirees as they seek extra income either by re-entering the workforce or by earning referral fees by making job introductions that result in new jobs.

Many companies encourage employees to recommend good potential employees and sometimes pay them a finder's fee if a job is taken. This patent has the potential new employee, not the company, set and pay the job reward. Company insiders will need to inform their employer of any potential conflict of interest due to the existence of a personal introduction contract with a potential employee. On the other hand, these introductions may yield two payoffs—one from the company and one from the individual. We can expect people within companies to search their internal job board to see if there is a job that some outsider might qualify for, interview for and accept, and then they would search the website to make a match and offer an introduction.

Expected Results

This website will popularize social networking as it is driven by economics, helping people make more money. Businesses will see slightly higher turnover but increased innovation and profits as hiring and termination costs are lowered by the ease of getting a new job through this website. The discussions between company insiders and potential hires will generate new business ideas. This website will reduce hiring costs as the need to pay headhunter fees is reduced, and we expect companies to offer to pay the "job reward" to place an existing employee with another firm, as an outplacement alternative. Additionally, we expect to see churches and state and federal governments to sponsor unemployed individuals by offering to pay or subsidize the job reward for those individuals. These incentives will reduce unemployment.

The possibility of receiving referral fees will incent individuals to make personal introductions between their contacts at specific companies and those seeking a job or a sale at those companies. This social networking provides opportunities for conversations on technology, productivity, business development, and professional opportunities. These conversations can lead to job interviews or introductions to hiring or purchasing managers, but they can also create new ideas and perceived market opportunities that drive business plans and capital formation. As a result, these new ideas create new job or sales opportunities. These opportunities cause internal and external job finders to network and seek out good people to fill those positions, drawing the best talent to the best opportunities and opening up good jobs for everyone else. More importantly, "everyone else", not just the best and brightest, can use this patented method to enlist the help of others in their search for work or sales leads.

SUMMARY OF THE INVENTION

In our process, a job seeker uses the promise of a job reward or a "contingent referral fee" at a social networking site to attract many offers for personal introductions to company insiders. From these offers, the job seeker chooses to contract with several people rather than a single headhunter. The contract uses a "contingent referral fee" inasmuch as no fee is paid unless the person starts a job at the company cited in the agreement, and the contract is a "single party show" contract inasmuch as the agreement applies to a single company for a set period of time. What is new is that anyone, not just a headhunter or professional agent, can contract to provide a personal introduction to a company insider, perhaps to him/herself. The job seeker may end up with dozens of electronically approved contracts for dozens of personal introductions, resulting in dozens of job interviews. As long as the job seeker is limited to a single personal introduction contract per company and the job seeker only starts a single job within the designated period, only one referral fee would need to be paid. A unique feature of the contract is that this is not an agency agreement, so no representation is implied or established. Rather, the fulfillment of the contact is contingent on only two events happening—an introduction to a company insider is made and a job is started at that company within the timeframe specified in the contract. If both events happen, the job seeker is required to pay the contingent referral fee. Fortunately, the job seeker doesn't have to pay any money up front, and only has to make partial payments over time AFTER they start their new job.

Figure 1:
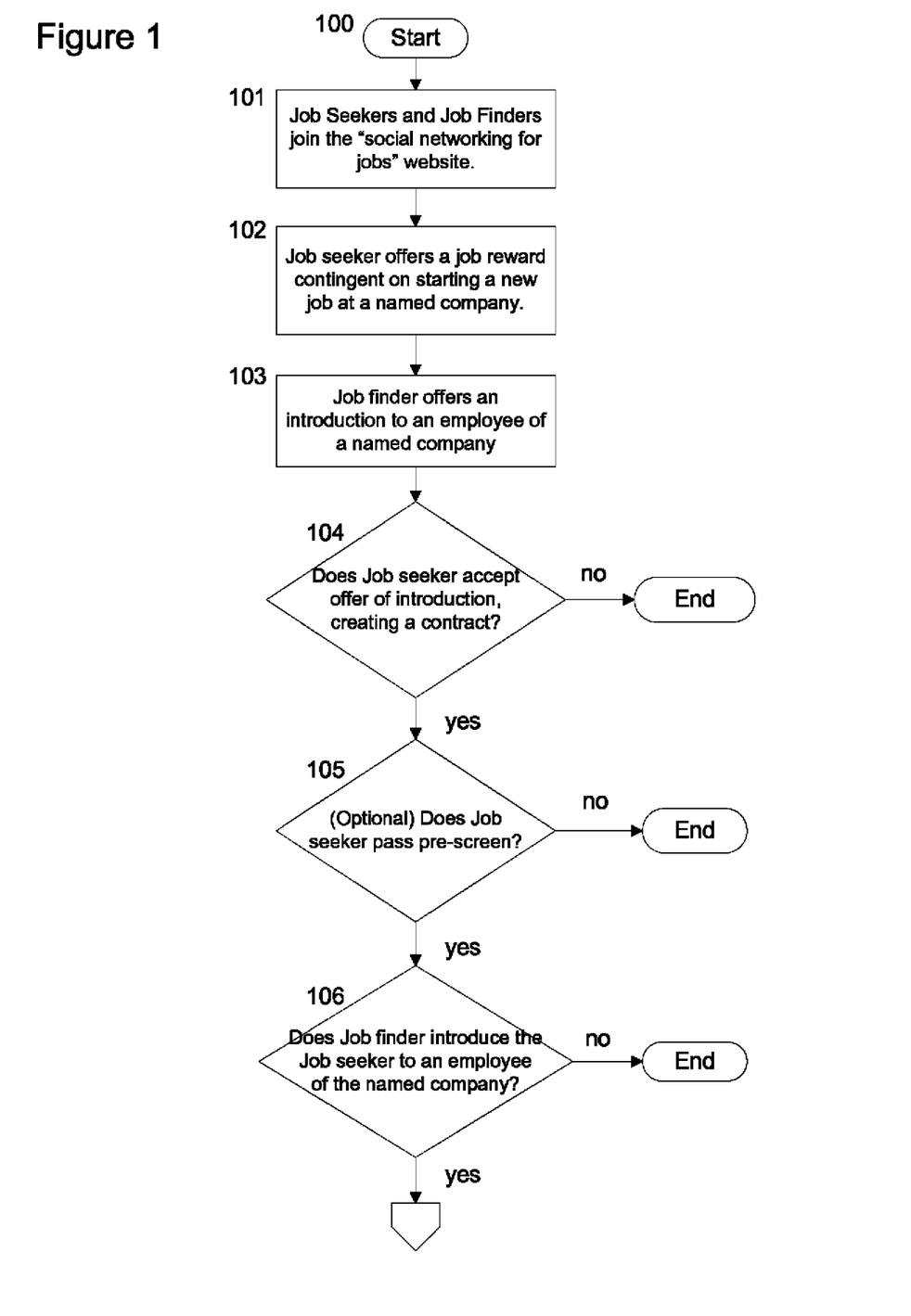
FIG. 1 is a flowchart for an individual or contractor seeking employment. The website promotes and establishes contingent referral fee contracts between a job seeker and a job finder for a personal introduction to an employee at a named company. The referral fee would need to be paid if the job seeker started a job at the named company within the time frame specified in the contract.

DETAILED DESCRIPTION OF THE PREFERRED EMBODIMENT OF THIS METHOD (SEE FIG. 1)

Figure 2:
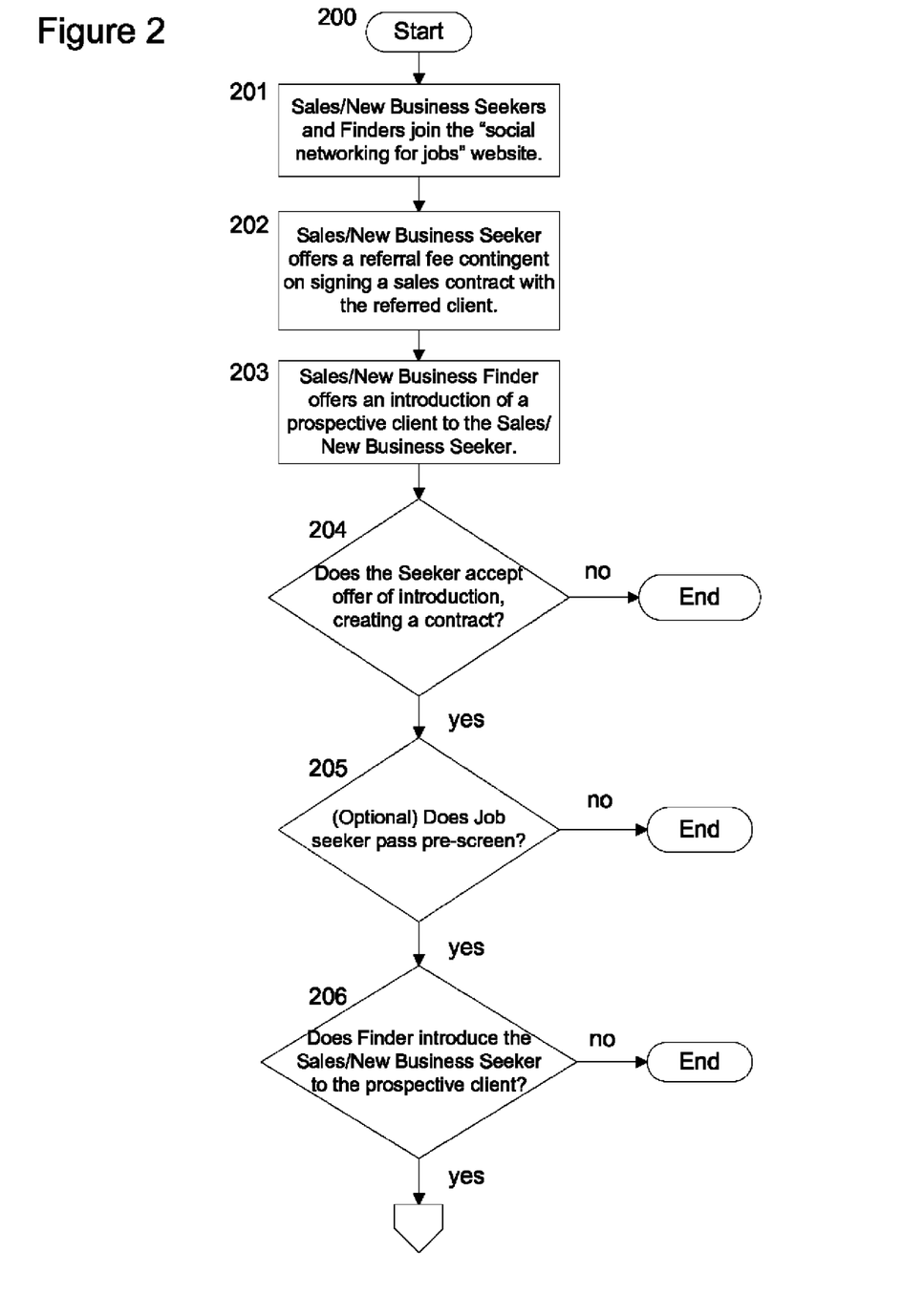
FIG. 2 is a flowchart for businesses and commissioned sales people looking to generate sales through sales leads. The website promotes and establishes contingent referral fee contracts between a salesperson or business representative and a referrer for a personal introduction to an employee at a named company. The referral fee would need to be paid to the referrer if a sale or sales contract was made with the named company within the time frame specified in the contract.
Figure 3:
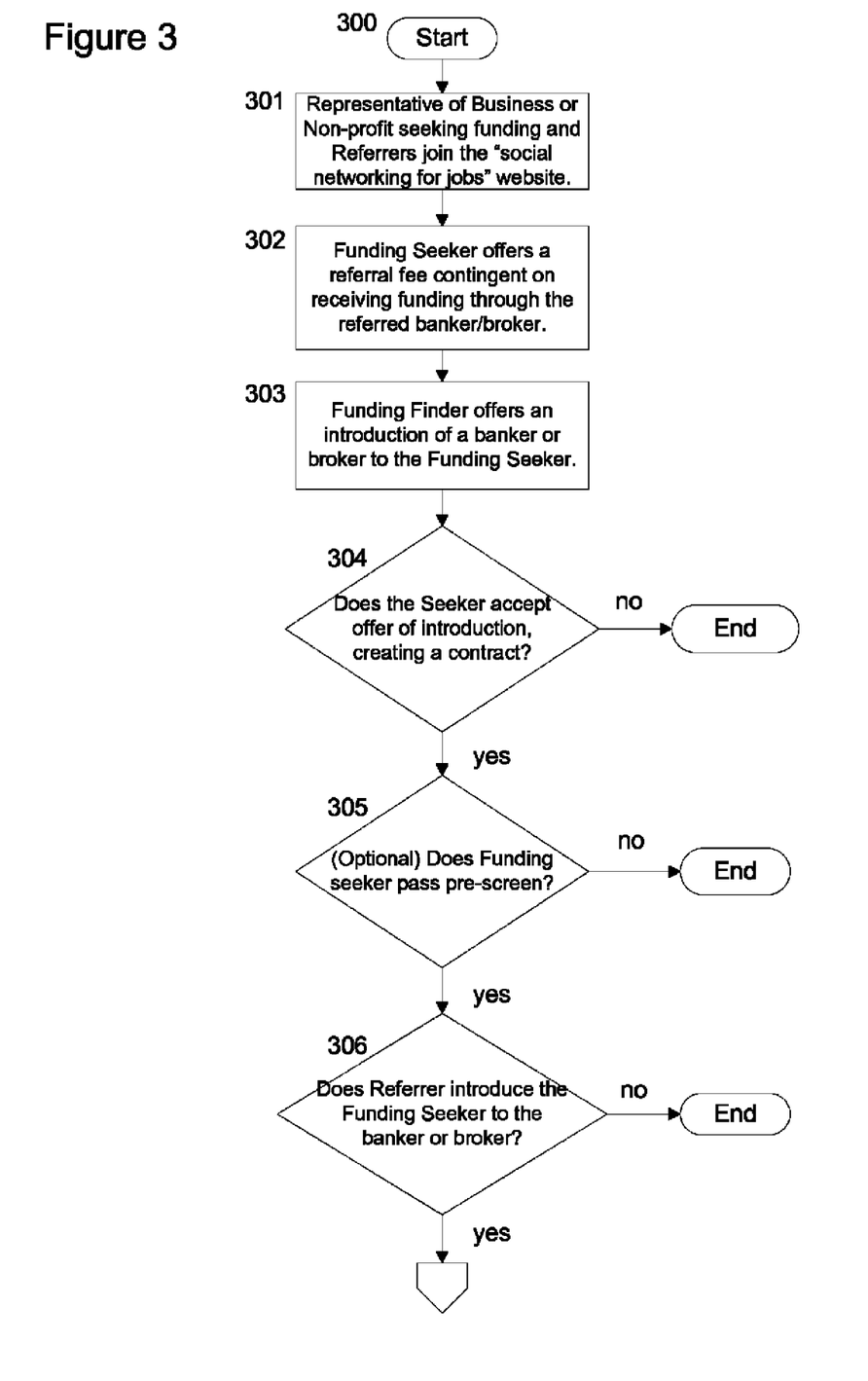
FIG. 3 is a flowchart for businesses and non-profits trying to raise funds. The website promotes and establishes contingent referral fee contracts between a business representative and a referrer for a personal introduction to an employee at a named company that is in the business of raising or providing funds for other companies. The referral fee would need to be paid to the referrer if the named company raised funds for the represented business within the time frame specified in the contract.

1. 101 The job seeker signs up at the social networking website, choosing their profession and choosing a city or region where they would like to start a new job. They agree to the "terms of use" which include a fraud clause and the site's exclusive use of the database. They choose or are assigned a unique anonymous identity and a mailbox at the site. Job finders sign up for mailboxes in a similar fashion.
2. 102. The individual specifies an ideal job and sets a job reward (either an amount or a percentage, typically two to ten percent of annual pay), the fee that would be paid if they started a new job that met their expectations. [This idea also applies to salespeople or business representatives looking for sales leads and businesses or non-profits looking for funding. (See FIGS. 2 and 3.)] They name their preferred employer(s). They are also given an opportunity to submit a professional profile, identifying why an employer might want to hire them. This profile includes their education, professional experience, and certification as well as a personal branding statement.
3. 103. Job "finders" can search the site by profession and location or by preferred company name. There they find single line records of job seekers' identity codes, job rewards, ideal job titles, and preferred companies. Job finders view the job seeker's job profile and click on "Make me an offer" to offer a personal introduction to a company insider. A pop-up window website asks for the name of the company. After the company name is entered, the website asks the job finder to confirm the proposed introduction. Once confirmed, an email is sent to the job seeker's "Offers" email in-box.
4. 104. The job seeker can either accept or reject the emailed offer of a personal introduction. If the job seeker accepts, a contract is formed, including its terms, conditions, and contingencies. The website archives the contract and forwards the job seeker's preferred contact information to the job finder. Other simultaneous contracts may be formed with the same or other job finders and job seekers. However, the contract specifies that job finder has an exclusive contract (typically for 4 months) for that company for that job seeker if a personal introduction occurs within the period specified in the contract (typically one month).
5. 105. The terms of the contract are such that no personal introduction is guaranteed. Typically, a job "finder" will want to pre-screen the applicant before setting up a meeting for the introduction with the company insider.
6. 106. If the job seeker passes the pre-screen, the job finder sets up a meeting at a safe public location to introduce the job seeker to the company insider. The company insider may be a relative, friend, business associate or a personal acquaintance from a social networking website. The company employee is privy to the company's culture, internal job board, organizational structure and business plans. They are in a unique position to judge what talents and skills are valued at this time by the company. Without divulging insider information, they can let someone know how to best approach the company in hopes of getting hired and how to best prepare for a job interview. Before the introduction meeting, the job finder may want to meet with the job seeker at a notary to have the contingent contract signed by both parties and have it notarized to make it "official". During the introduction meeting, the job finder may want to photograph the job seeker and company insider shaking hands as evidence that the introduction did occur.

7. 107. The company insider may want to check out the job seeker's resume and ask a few job interview questions. If the job seeker passes the employee's screen and is considered a good job candidate, the company insider may direct the job seeker to apply for a specific job or to send their resume to a specific hiring manager. They may introduce the job candidate to others within the company, leading to more discussions and potentially a job interview. No job interview guarantees a job offer. Still, multiple job interviews may result in one or more job offers.

8. 108. Even an accepted job offer does not trigger a referral fee payment. Only a started job completes the job finder's portion of the contract and triggers the job seeker's obligation to pay the referral fee specified in the contract. Sometimes applicants may fail the company's drug test, security screening, or legal work status or the applicant may choose to pursue other career opportunities. (Company records and HR personnel can verify employment, proving the start of work date.)

9. 109. The standard arrangement is to have the referral fee paid over a one-year period with the first 10% due two months after the start-of-work date and nine more payments due on the same day of the month in the nine subsequent months. The website is paid 5% of the referral fee, getting half of the first 10%. The other 95% goes to the job finder, the person making the original introduction to the company insider. The website also offers to facilitate payments, for a small fee.

Essential Features of the Website

1. The social networking website should capture and display the "job reward", the contingent referral fee chosen by the job seeker in the job seeker's profile. Examples of job rewards choices might include "$5000", "5% of annualized pay", "50% of the annualized pay increase", or "50% of the annual bonus".
2. The website needs to have an "offer system" that allows a job finder to make an offer of introduction to an employee of a named company. This generates an email offer to the job seeker that the job seeker either accepts or rejects. The job finder fills in the name of the company in the field provided. The website provides standard contingent referral fee contract language in the email, pulling the "job reward" from the job seeker's profile and the "named company" from the company name field as inputted by the job finder. The offer system allows multiple outstanding offers and multiple accepted offers (company-exclusive contingent referral fee contracts) to co-exist.
3. The website needs to have an email archive system to prove or disprove the existence of these contingent contracts and the terms contained therein.

Additional Features

4. As part of the "terms of use" agreement, the website is able to market the job seekers and their profiles directly to companies, generating direct inquiries and driving "personal introductions" coordinated through the website's employees who would earn referral fees if jobs were started as a result.
5. The website is organized by profession and location, facilitating networking and education and driving ad revenues for the website from ads for professional organizations, profession certification exams, specialized training firms, special interest groups, local and virtual colleges and universities, and magazines and books that target these professionals.
6. The website has search capabilities that allow users to find other users by user name, by profession, by location, and by level of job reward.
7. Both the job seekers and the job finders remain anonymous within the website but are identifiable by their user name. However, company names, college names, and other professional attributes and key words in their professional profiles are searchable, generating email inquiries from both in hopes of creating discussions of common interests, perhaps leading to a personal introduction contract, and potentially to a new job requiring the payment of a referral fee.
8. Mentoring is actively encouraged to develop talents (social skills, business acumen, and technical capabilities) to qualify candidates for higher-paying jobs. Emails and online ads drive traffic to a webpage that matches mentors and job seekers. Webinars are also offered as an alternative to individual mentoring. Mentoring and webinars will generate additional revenue for the website.
9. Job seekers are offered the opportunity to post personal digital portfolios of their research, professional articles, completed projects, and works-in-progress. This value-added services will generate additional revenue for the website.
10. Job seekers are offered the opportunity to post video resumes. This value-added services will generate additional revenue for the website.
11. In addition to facilitating payments, the website will offer to take deposits on referral fees. Deposited referral fees will assure job finders that they will be compensated if a job is conferred to the introduced job seeker.

Essential Features of the Contingent Referral Fee Contract (See "Contract")

1. The names of the parties involved—job seeker, job finder, named company
2. Terms—The terms of the offer (start and expiration), the term for the introduction, the term for contingent commencement of employment, the terms for payment of the job reward (amounts and timing) including the portion that is paid to the website.

Additional Features of the Contingent Referral Fee Contract

Fraud clause—While noting that this contract is legally binding, the contract states that the job seeker needs to notify the job finder and the website that he/she has started a job with the named company within one month of doing so and if they don't, they are committing a fraud. This feature will improve compliance.

What is claimed is:

1. A method implemented using a website on a web-based system obtaining a new job for a job seeker and generating a contingent referral fee for a job finder, comprising the steps of
   (a) establishing a secure social networking website, wherein the secure social networking website is hosted on a web server that includes an email system and a database that provides email and database search, query and display capabilities for the secure social networking website;
   (b) obtaining a job seeker and a job finder who agree to terms of use of the secure social networking website;
   (c) the job seeker enters into the database the job seeker's profession, professional profile, preferred job location, preferred employers and a contingent referral fee that the job seeker would pay if the job seeker started a new job at a named company within a specified period of time after an introduction to an employee of the named company, which the database stores;
   (d) the job finder searches the database, identifies the job seeker as a potential hire for a particular company and sends an email through the email system to the job seeker, wherein the email offers an introduction to a company insider(s), optionally the job finder himself or herself, via an offer system of the secure social networking website thereby offering a single company-exclusive contract with the job seeker, wherein the offered contract, if accepted, is stored in the secure social networking website database, which would obligate the job seeker to pay a contingent referral fee if the job seeker was introduced to a company insider by the job finder and the job seeker started a job at the named company within the period of time specified in the offered contract;
   (e) the job seeker responds through the offer system of the secure social networking website to accept one or more of the offers of step (d), thereby establishing a contractual obligation to pay the contingent referral fee if the job seeker is introduced, screened, interviewed and starts a job at the named company;
   (f) the job finder introduces the job seeker to one or more company insiders at the named company;
   (g) the named company screens and interviews the job seeker;
   (h) if the named company offers the job seeker a job, the job seeker accepts the job offer and starts the job at the named company, the offered contract of step (d) becomes a binding contract that obligates the job seeker to pay the contingent referral fee according to its terms, wherein the secure social networking website is utilized to facilitate paying the contingent referral fee if requested by the lob seeker or required by the terms of the contract; and
   (i) the owner of the secure social networking website is paid a use fee according to the terms of the binding contract of step (h).

2. The method of claim 1 wherein the secure social networking website database allows automated searching of job seekers by geography and profession and displays the amount of the contingent referral fee, whereby local job finders can identify job seekers for local job opportunities.

3. The method of claim 1 wherein said website accessible database allows to the job finder to perform an automated search or query of the database for the attributes of company names, college names, and other professional attributes and key words in the job seekers' professional profile and the database displays job seekers who have the searched or queried attributes, whereby email discussions of common interests are facilitated and whereby a basis is provided to the job finder to offer to make an introduction between the job seeker with a particular background or set of skills and the company insider.

4. The method of claim 1 wherein said secure social networking website accessible database allows the job seeker to perform an automated search or query of the database for company names in user profiles, including company names in the job finders' profiles, thereby enabling job seekers to identify job finders with contacts at desired potential employers and enabling the sending of emails through the email system to job finders to solicit offers of introduction thereby increasing the number of offers made.

5. The method of claim 1 wherein said secure social networking website utilizes an email-based offer system to generate a contingent referral fee contract between the job seeker and the job finder through email offers and acceptances with all terms and conditions of the contractual obligation to pay the contingent referral fee being specified and stored in the database, which enables retrieval of such contracts from the email archives by either party for a fee.

6. The method of claim 1 wherein said secure social networking website database allows the searching and displaying of user profiles by profession, enabling users to determine how their professional peers differentiate themselves within their profiles, in particular through education and certification, thereby providing an opportunity for the secure social networking website to derive revenues and profits through the use of click-through advertisements.

7. The method of claim 1 wherein said secure social networking website allows potential mentors and mentees to designate themselves as such in their user profiles, to search the database for matching mentors and mentees within their local geographical market, to connect through the website's email system, and to enter into the same contractual obligation to pay the contingent referral fee that the job seeker may enter into with a job finder.

8. The method of claim 1 wherein said database allows entry of and searching or querying for lob seeker digital portfolios to differentiate the job seeker's profile as a value-added for-fee service.

9. The method of claim 1 wherein said database allows entry of and searching or querying for the job seeker's a video resume to differentiate the job seeker's profile as a value-added for-fee service.

10. The method of claim 1 wherein said secure social networking website allows promotion of professional affiliation as a means to obtain the skills and contacts necessary for job advancement, thereby providing an opportunity for the secure social networking website to derive revenues and profits through the use of click-through advertisements.

11. The method of claim 1 wherein said secure social networking website database provides for protection of the job seeker's identity and only discloses, after a search or query of the database, a user-defined username and user profile for the job seeker, thereby enabling a job seeker to conduct a search for a new job without the job seeker's current employer's knowledge thereof.

12. The method of claim 1 wherein said secure social networking website's single company-exclusive contract includes in the database a fraud clause that requires timely notice of a started job at the company named in the binding contract of step (h).

13. The method of claim 1 wherein said secure social networking website's terms of use allow the searching or querying for and displaying of the job seeker's profile in a companion website database that provides employers information about the job seeker as stipulated by the secure social networking website's terms of use agreement, thereby enabling the owner of the secure social networking website database to act as the job finder and receive the referral fee if an accepted offer of introduction resulted in a started job for the job seeker.

14. The method of claim 1 wherein said secure social networking website allows payment of said contingent referral fee though the use of an electronic payment system for a fee.

15. The method of claim 1 wherein said database allows far the storage, search and retrieval of an acceptance and notification of a referral fee deposit to improve interest in the job seekers profile and to improve the website's profits with the interest earned on the referral fee deposit.

* * * * *

UNITED STATES PATENT AND TRADEMARK OFFICE
CERTIFICATE OF CORRECTION

PATENT NO. : 8,249,995 B2  Page 1 of 1
APPLICATION NO. : 12/427734
DATED : August 21, 2012
INVENTOR(S) : Robert Anthony Sheperd It is certified that error appears in the above-identified patent and that said Letters Patent is hereby corrected as shown below:

Title page, item [73]

Delete

Assignee: "Robert A. Shepard"

should be

Assignee: Robert A. Sheperd

Signed and Sealed this
Thirteenth Day of November, 2012

David J. Kappos
*Director of the United States Patent and Trademark Office*